United States Patent

Karubian

[15] 3,703,036
[45] Nov. 21, 1972

[54] SEPARABLE CONNECTION MEANS FOR RECIPROCATING SAW BLADES

[72] Inventor: Ralph Karubian, 2001 Gage Avenue, Los Angeles, Calif. 90047

[22] Filed: May 3, 1971

[21] Appl. No.: 139,782

[52] U.S. Cl..................30/339, 30/166, 143/156 R, 145/108 R
[51] Int. Cl. .............................................B26b 1/00
[58] Field of Search........30/166, 272, 339; 145/33 A, 145/33 B, 33 C, 33 D, 33 E, 108 R, 108 A, 108 B; 143/68 A, 68 C, 68 E, 68 G, 133 R, 156 R

[56] References Cited

UNITED STATES PATENTS

| | | |
|---|---|---|
| 311,170 | 1/1885 | Beurmann..............143/156 R |
| 2,305,465 | 12/1942 | Bangser..................30/339 X |
| 2,783,792 | 3/1957 | Keesling.................143/156 R |
| 2,953,175 | 9/1960 | Robinson................30/339 X |
| 2,954,808 | 10/1960 | Sweeney............143/156 R X |
| 3,056,437 | 10/1962 | Mittins...............143/156 R X |
| 3,555,678 | 1/1971 | Agulnick.....................30/166 |

Primary Examiner—Robert C. Riordon
Assistant Examiner—J. C. Peters
Attorney—Hyman Jackman

[57] ABSTRACT

A separable connection between the end of a saw blade and the slide that reciprocates it, the connection including a shoulder screw that tightens two clamp members, one on each side of said blade, one of said members being an integral part of the slide, the shoulder of said screw fitting the enclosed circular portion of a notch in said blade end when the latter is clamped, and said notch having a reduced leadin portion extending from the hole in the blade through the adjacent end of the blade, thereby allowing the blade to be slipped out from between said clamp members when the screw is retracted sufficiently to withdraw the shoulder from the hole, while the screw and the two clamp members remain loosely attached to the slide so a replacement saw may be secured to the slide with easy facility.

6 Claims, 5 Drawing Figures

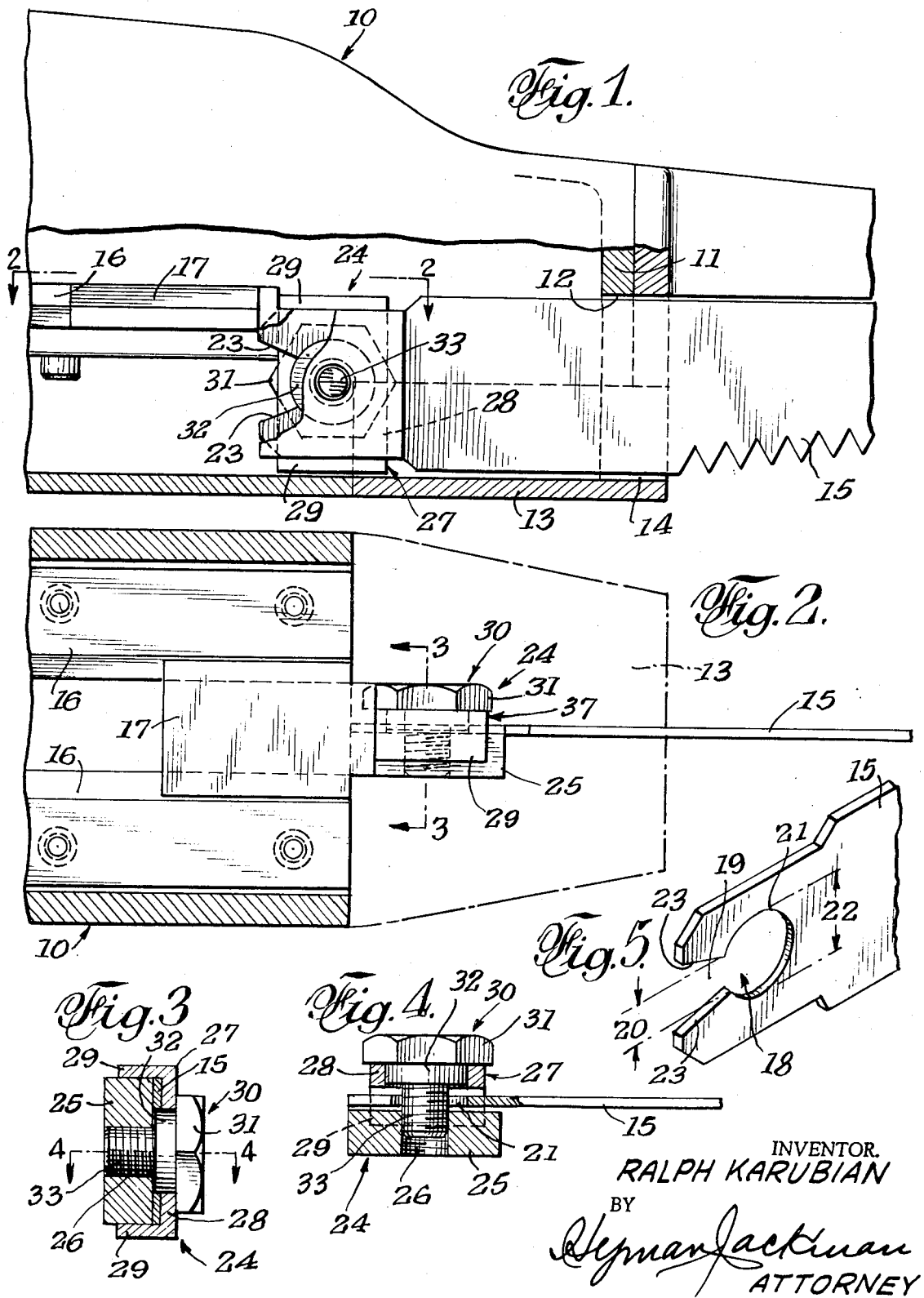

SEPARABLE CONNECTION MEANS FOR RECIPROCATING SAW BLADES

BACKGROUND OF THE INVENTION

1. Field of the Invention

Certain machines, such as carcass saws, enclose the end of a saw-blade that is replaceably secured to means that reciprocate it, the object being to keep saw-cut material from reaching the slide, thereby causing fouling of the slideways. Such housings render the saw-securing means more difficult to reach and, moreover, necessitates that the screw that fastens the saw blade to the slide to be entirely removed from its blade-clamping position, thereby separating at least one of the saw-clamping members. Since said screw and plate are loose, separated elements, the securing of a replacement blade to the slide is rendered more difficult and time-consuming due partly to the need for handling at least three separate elements, saw blade, screw and one of the clamp members, and partly due to the confined area in which such replacement takes place.

2. Description of the Prior Art

The art known to the applicant, provides its saw blades with enclosed openings or holes for their fastening screws thereby preventing removal of such blades from the means that reciprocate them unless such screws are removed in their entirety.

SUMMARY OF THE INVENTION

A separable connection for a saw-blade that is partly enclosed within a housing and, generally, comprises a clamp plate that is integrally provided on a reciprocative slide, a separate clamp plate non-rotationally engaged with the first-mentioned clamp plate, the end of the saw blade that is clamped between said plates having an open-ended notch that is formed to have a leadin portion and larger circular portion, the first-mentioned clamp plate being provided with a tapped hole smaller than said circular portion and the separate clamp plate being provided with a circular hole of substantially the same size as the mentioned circular portion of the open-ended notch, and a headed screw with a threaded end to fit the tapped hole and with a shoulder of the same size as the hole in the first-mentioned clamp plate and the larger circular portion of the notch in the blade. When the screw, from its position clamping the saw blade end, is retracted to withdraw said screw shoulder from the circular portion of the notch, the blade is free to be removed in an endwise direction since the leadin portion of said notch readily passes over the smaller threaded end of the screw.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combination and arrangements of parts, which will more fully appear in the course of the following description, which is based on the accompanying drawing. However, said drawing merely shows, and the following specification merely describes one embodiment of the present invention, which is given by way of illustration or example only.

In the drawing, like reference characters designate similar parts in the several views.

BRIEF DESCRIPTION OF THE DRAWING

FIG. 1 is a fragmentary, partly elevational and partly sectional side view of separable connection means according to the present invention.

FIG. 2 is a sectional plan view as taken on the line 2—2.

FIG. 3 is a cross-sectional view as taken on the line 3—3 of FIG. 2, the parts being shown in saw-clamping position.

FIG. 4 is a sectional view as taken on the plane of line 4—4, the parts being shown in non-clamping position.

FIG. 5 is a perspective view of the end of the saw blade provided with a notch according to the invention.

DESCRIPTION OF THE PREFERRED EMBODIMENT

The present separable connection means is shown enclosed in a housing 10 which, in this case, has a forward end portion 11 with a slot 12 therein, and is fitted with a removable tray-like portion 13 that has an aligned slot 14 that, together with the slot 12 and with suitable clearance, accommodates the rearward end of a saw blade 15. Said portion 13 is removable to provide access to the interior of the housing. As is best seen in FIG. 1, the housing 10 is provided with a pair of slideways 16 to guide a slide 17 which is reciprocative by any suitable means (not shown) fitted to the rearward end of the housing 10.

An important feature of the invention is best illustrated in FIG. 5. The same consists of an open-ended notch 18 in the inner end of the saw blade 15, said notch comprising a narrower leadin portion 19 that is restricted to a throat dimension 20 and a circular portion 21 having a larger diametral dimension 22. The leadin portion 19 of the notch is formed to have rearwardly flaring edges 23 for reasons that will be later apparent. Further, the width of the blade is reduced at the notched end, as shown.

The present means 24 for separably connecting said slide 17 and the saw blade 15 comprises, generally, a first clamp member 25 that is shown as a forwardly and downwardly directed integral extension of the slide 17 and is provided with a transverse tapped hole 26 of a size to receive a screw end that has clearance to pass through the throat 23 of the blade according to dimension 20.

The means 24 includes a second and separate clamp member 27 in the form of a channel which has a vertical web 28 of the same height as that of the clamp member 25, and two flanges 29 that extend into engagement with the upper and lower faces of the member 25, thereby retaining non-rotational alignment of the clamp members. The mentioned reduced end of the saw blade 15, as shown in FIG. 3, conforms in height to that of the member 25. The web 28 of member 27 is provided with a hole coincidental in position and size to that of the circular portion 21 of the notch 18. It will be noted that the flanges 29 of clamp member 27 are of sufficient depth to enable the web thereof to be withdrawn literally to some degree and yet retain engagement of the flange and the mentioned upper and lower faces of clamp member 25.

The means 24 further includes a screw 30 that has a preferably polygonal head 31, a cylindrical shoulder 32 of a diametral size to fit the circular portion 21 of the saw blade notch 18, and a threaded stem 33 extending from said shoulder of a size to threadedly engage in the tapped hole 26 and pass through a leadin portion 19 of the saw blade.

As can be seen in FIGS. 3 when the screw 30 is applied to clamp the notched end of the saw blade 15 between the clamp members 25 and 27, with the head 31 of the screw and the threads of the stem 31 cooperating to draw the clamp members together, the blade is tightly clamped so the same cannot be removed from the slide 17.

When removal of the blade is desired, as when replacing thereof is desired, the housing portion 13 is removed and, with the slide 17 preferably in the forward position of FIG. 2, a suitable tool may be applied to the screw head 31 so the stem 33 of the screw may be partly withdrawn from the tapped hole 26 of the clamp member 25. The clamp member 28 is now loosened and can be slid back as limited by the screwhead to retract the shoulder 32 from the circular enlargement 21 of the notch 18 while the screw stem 33 is yet in partial engagement with the clamp member 25.

The above loosened condition is shown in FIG. 4, the same showing the blade free to be slid to the right, thus effecting its removal. A replacement blade can readily be slid between the clamp members of the connecting means and the screw 30 retightened to the position of FIG. 3. The flaring edges 23 of the open-ended notch facilitates such replacement of a blade by guiding the blade into operative engagement with the screw.

While the foregoing has illustrated and described what is now contemplated to be the best mode of carrying out the invention, the construction is, of course, subject to modification without departing from the spirit and scope of the invention.

Having thus described the invention, what is claimed and desired to be secured by Letters Patent is:

1. Separable means for connecting an end of a saw blade to a reciprocating member, said means comprising:
    a pair of clamp members, one of which is a fixed part of the reciprocating member,
    one clamp member having a tapped hole and the other a diametrally larger hole,
    a screw to fasten said clamp members together with said end of the saw blade between them, said screw having a head, a cylindrical shoulder part inward of said head of a size to rotationally fit the larger hole of one of said clamp members, and a threaded stem extending from said shoulder to fit the tapped hole of the other clamp member, and
    said end of the saw blade being provided with an open-ended notch, the inner end of which has a circular portion of the size of the mentioned larger hole, and the open end of which is large enough to pass the stem of the screw,
    said end of the saw blade, when clamped between the clamp members with the shoulder part of the screw extending into the circular portion of the open-end notch, being securely connected to the reciprocating member, and
    said saw blade, when the screw is backed off sufficiently to withdraw its shoulder part from the circular portion of the notch, releasing the blade for endwise removal from its connection to the reciprocating member while the screw stem retains operative engagement with the member having the tapped hole.

2. Separable means according to claim 1 in which the smaller open end of the notch is defined between outwardly flaring edges that define a leadin.

3. Separable means according to claim 1 in which one of the clamp members is provided with at least one flange that extends in a direction to have overlapping and non-rotational engagement with an edge of the other clamp member.

4. Separable means according to claim 3 in which the mentioned end of the saw blade is reduced at least at one edge to be in underlapped engagement with the mentioned flange.

5. A saw blade and the like having in one end thereof: an open-end notch,
    the inner end of said notch being circular, and the portion of the notch between the circular end of the blade being constricted in size relative to the size of the circular end of the notch.

6. A saw blade and the like according to claim 5 in which the edges of the blade that define the constricted portion of the notches being flared from the circular end of the notch to the adjacent end of the saw.

* * * * *